United States Patent [19]
Portaro et al.

[11] Patent Number: 5,548,941
[45] Date of Patent: Aug. 27, 1996

[54] METHOD OF FEEDING GROUPS OF TOBACCO ITEMS, IN PARTICULAR CIGARETTES, TO A CONTINUOUS PACKING MACHINE

[75] Inventors: Antonio Portaro, Milan; Antonio Gigante, Bologna; Fabio Sassi, Imola; Bruno Belvederi, S. Martino Di Monte S. Pietro, all of Italy

[73] Assignee: G.D Societa' Per Azioni, Bologna, Italy

[21] Appl. No.: 274,983

[22] Filed: Jul. 13, 1994

[30] Foreign Application Priority Data

Jul. 13, 1993 [IT] Italy ................................. B093A0321
Jun. 30, 1994 [IT] Italy ................................. B094A0303

[51] Int. Cl.$^6$ ................................................. B65B 19/04
[52] U.S. Cl. ........................ 53/444; 53/148; 53/150; 53/151; 198/418.1; 221/252; 221/296
[58] Field of Search .................... 198/418.1, 418.2, 198/418.3; 221/252, 296, 298; 53/444, 148, 149, 150, 151

[56] References Cited

U.S. PATENT DOCUMENTS

| | | | |
|---|---|---|---|
| 1,961,047 | 5/1934 | Horgan | 53/149 |
| 3,672,541 | 6/1972 | Niepmann | 221/252 X |
| 3,790,025 | 2/1974 | Brodbeck | 53/148 X |
| 4,167,091 | 9/1979 | Ruppert et al. | 53/151 X |
| 4,489,534 | 12/1984 | Gomann et al. | 53/151 |
| 4,607,477 | 8/1986 | Hinchcliffe et al. | 53/444 |
| 4,646,938 | 3/1987 | Focke | 53/150 X |
| 4,648,232 | 3/1987 | Brinker et al. | 53/151 X |
| 4,827,691 | 5/1989 | Hanada et al. | 53/151 |
| 4,953,711 | 9/1990 | Focke | 53/151 X |
| 5,070,991 | 12/1991 | Hinchcliffe et al. | 198/418.3 |

FOREIGN PATENT DOCUMENTS 1524463 9/1978 United Kingdom.
2193701 2/1988 United Kingdom.

*Primary Examiner*—John Sipos
*Assistant Examiner*—Daniel Moon
*Attorney, Agent, or Firm*—Marshall, O'Toole, Gerstein, Murray & Borun

[57] ABSTRACT

A method of feeding a continuous packing machine with groups of tobacco items, in particular cigarettes, composed of at least one layer of items, whereby a continuously-moving conveyor with pockets for respective groups is supplied successively with the groups, each of which is expelled from a feedbox in a substantially transverse direction in relation to the items by arresting the items inside the feedbox and over the expelled items.

7 Claims, 3 Drawing Sheets

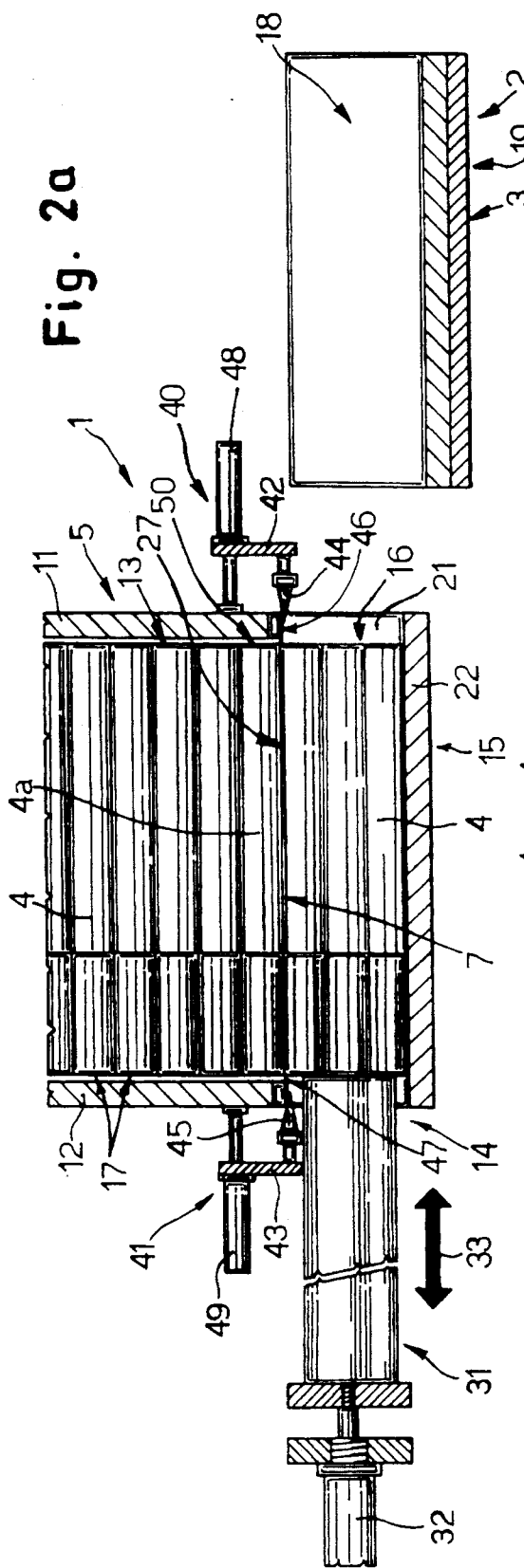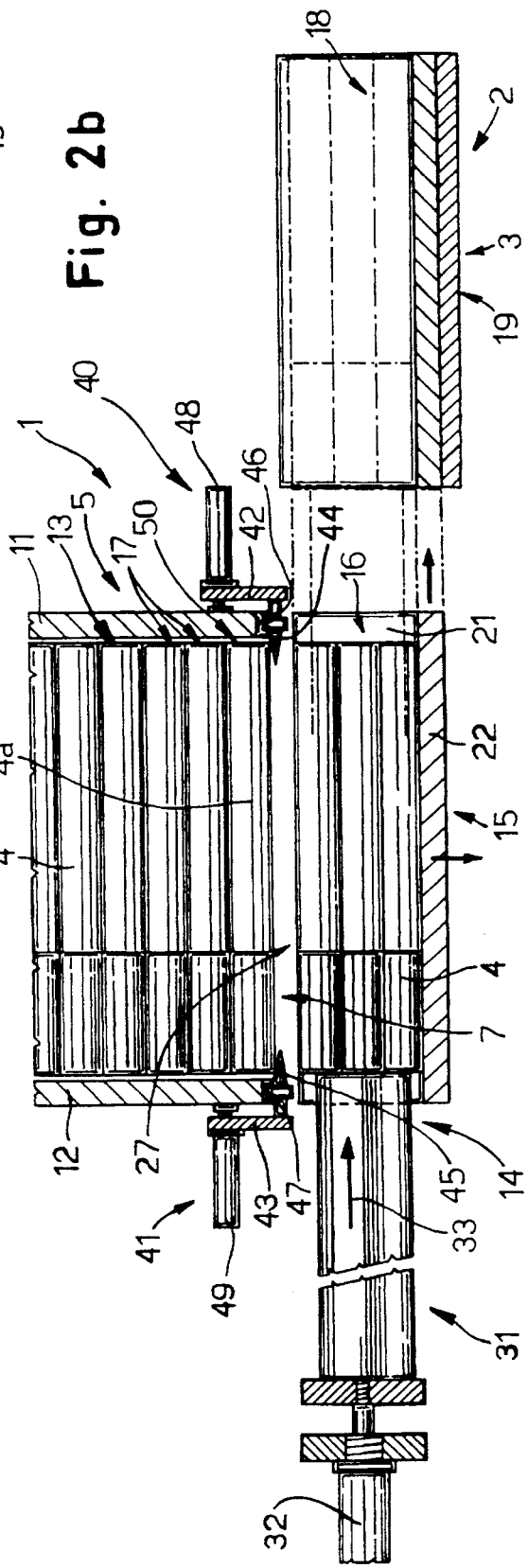

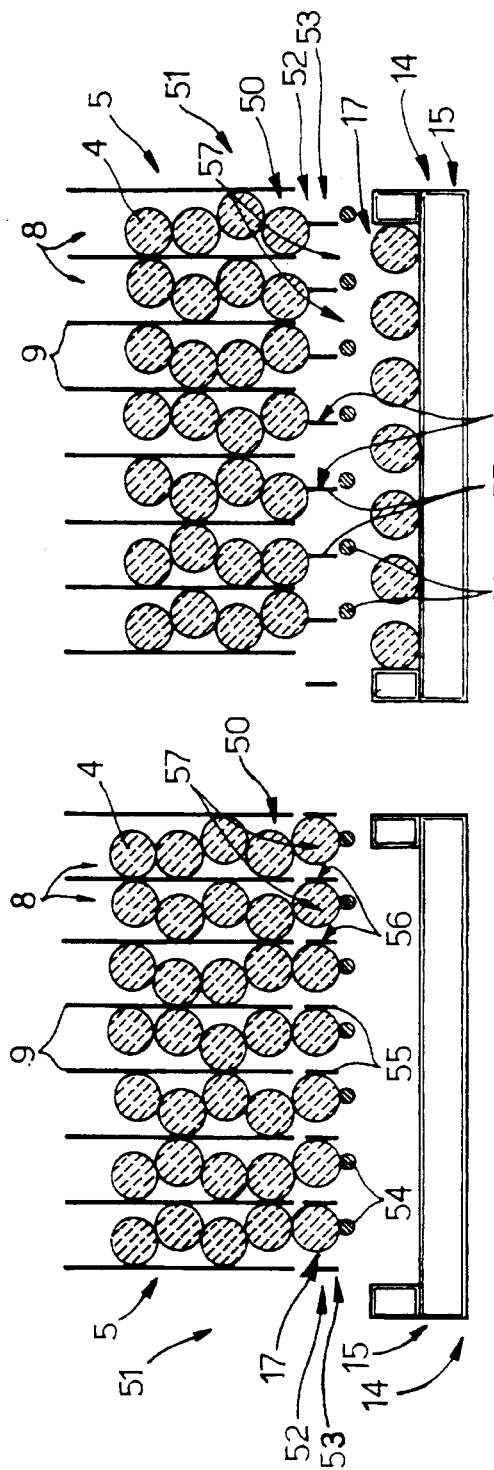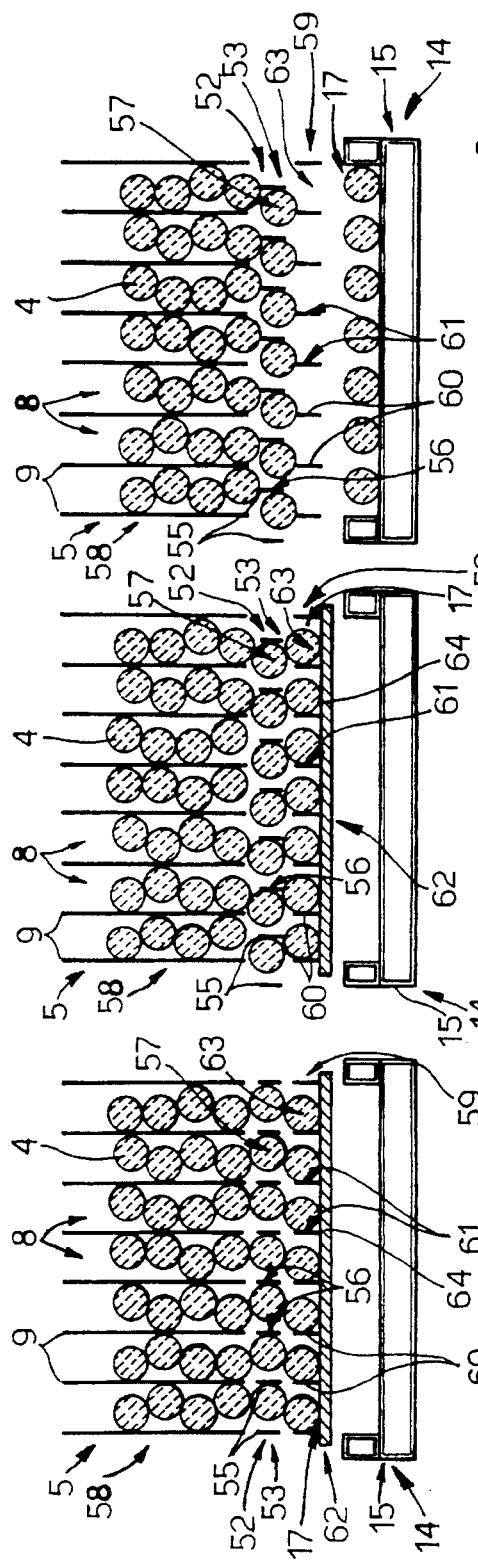

METHOD OF FEEDING GROUPS OF TOBACCO ITEMS, IN PARTICULAR CIGARETTES, TO A CONTINUOUS PACKING MACHINE

BACKGROUND OF THE INVENTION

The present invention relates to a method of feeding groups of tobacco items, in particular cigarettes, to a continuous packing machine.

In the following description, reference will be made purely by way of example to the feeding of groups of cigarettes to said packing machine.

In the tobacco industry, reciprocating cigarette packing machines are employed, i.e. wherein the cigarettes normally travel in steps and are handled by means of reciprocating members.

Reciprocating packing machines feature an input device comprising a cigarette feedbox normally presenting at least three outlets, each defined by a number of side by side, substantially vertical channels in turn defined by a number of side by side, substantially vertical partitions.

For each outlet, the input device also comprises a fixed box for receiving a group of cigarettes composed of at least one layer, and positioned facing the bottom end of the relative channels. The input device also comprises a reciprocating push device for axially engaging the cigarettes in the group inside the box and expelling them axially from the box into a pocket on a conveyor travelling in steps in a direction perpendicular to the cigarettes inside the feedbox, and which provides for feeding the groups of cigarettes to the packing machine.

In known input devices of the above type, each cigarette, on leaving the bottom output end of the respective channel and being positioned inside the box, supports the entire column of cigarettes aligned inside the respective channel, and is positioned with a generating line contacting the bottom cigarette in the respective column. Also, both in the upper layer of the group inside the box, and in the layers defined inside the feedbox by the columns of cigarettes inside the respective channels, the adjacent cigarettes are separated slightly in a horizontal transverse direction, due to the presence of the partitions. Consequently, when the group of cigarettes inside the box is moved in a substantially horizontal, transverse direction in relation to a fixed bottom layer, i.e. in relation to the layer defined by the bottom cigarettes in the respective columns, each cigarette in the bottom layer automatically moves into a pocket defined beneath, and by the two columns separated by, each partition, and at the same time the cigarettes in the respective columns drop down once more into contact with the cigarettes in the upper layer.

As such, a minimum amount of lateral movement of the group of cigarettes inside the box is sufficient to offset the cigarettes in relation to those in said bottom layer, and to clamp them transversely in the offset position, so that, with known feed devices, the cigarettes in said group can only be expelled purely axially.

In the case of a reciprocating packing machine, the above limitation poses no real inconvenience, in that, during expulsion, the pocket of the conveyor supplying the packing machine is stationary and aligned with the box. In the case of a continuous packing machine, on the other hand, the above limitation poses serious drawbacks involving the use of complex pocket type feed conveyors travelling in steps at the input feedbox, and continuously at an unloading station where the groups of cigarettes are unloaded on to a continuously operating follow-up portion of the packing machine.

SUMMARY OF THE INVENTION

It is an object of the present invention to provide a method of feeding groups of tobacco items to a continuous packing machines, designed to substantially overcome the above drawbacks.

According to the present invention, there is provided a method of feeding groups of tobacco items, particularly cigarettes, to a continuous packing machine, the method comprising stages consisting in successively withdrawing groups comprising at least one layer of items from the outlet end of a feedbox, and successively feeding the groups into the pockets of an input conveyor of the continuous packing machine; characterized in that it comprises stages consisting in advancing the conveyor continuously and at a given speed past said feedbox in a transverse direction in relation to the items inside the feedbox; arresting each item inside the feedbox in a fixed position over said group to be expelled; and expelling each said group from the outlet of the feedbox substantially in said direction.

Following said arresting stage, the above method preferably also comprises a further stage wherein the items in said group are detached from the arrested items inside the feedbox.

BRIEF DESCRIPTION OF TEE DRAWINGS

A number of non-limiting embodiments of the present invention will be described by way of example with reference to the accompanying drawings, in which:

FIG. 2 shows a longitudinal section of the FIG. 1 device in two operating positions;

FIG. 3 shows a cross section of a first variation of the FIG. 1 device in two different operating positions;

FIG. 4 shows a cross section of a second variation of the FIG. 1 device in three different operating positions.

DETAILED DESCRIPTION OF THE INVENTION

Figure 1:
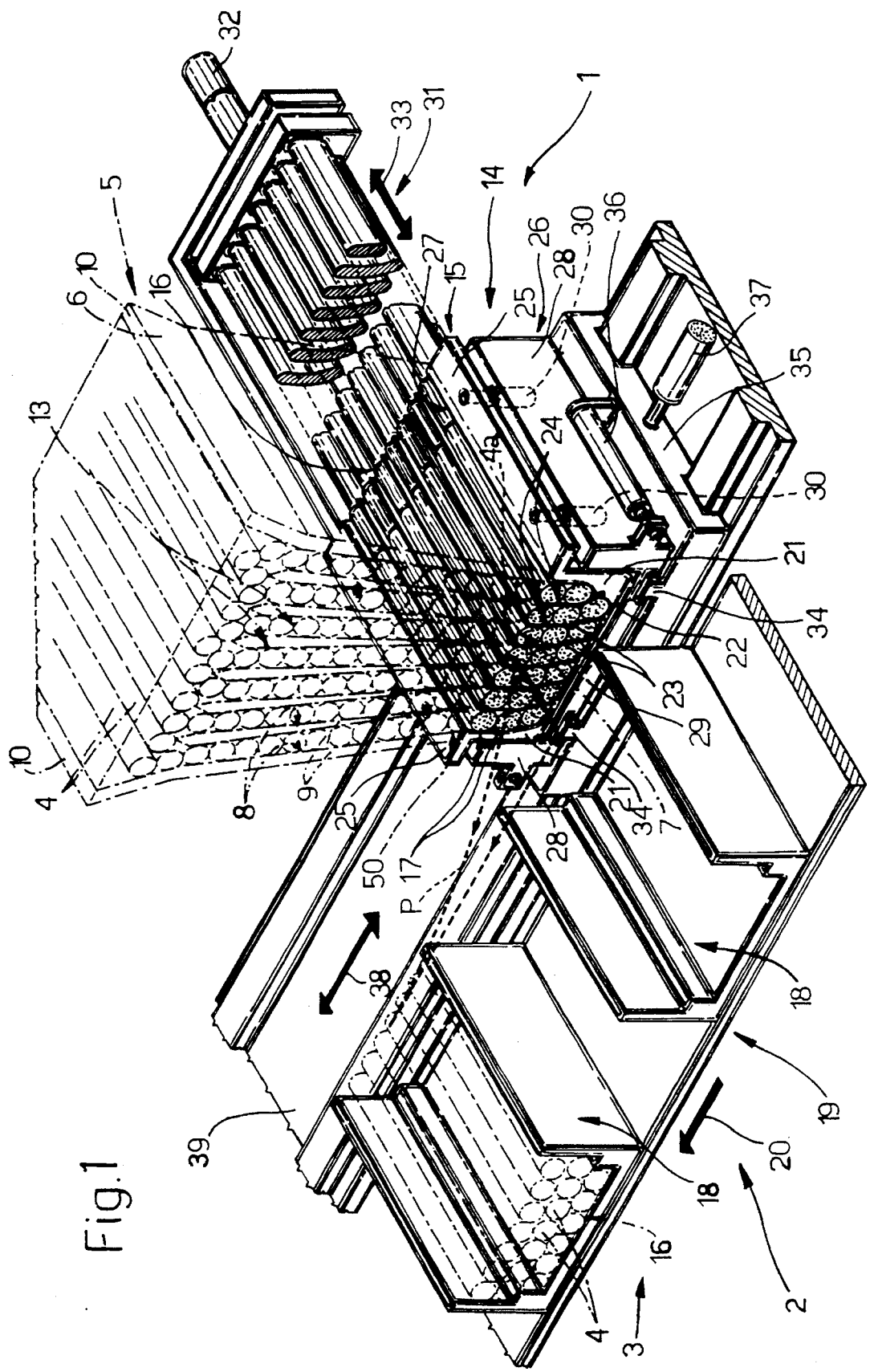
FIG. 1 shows a view in perspective, with parts removed for clarity, of the input device of a continuous packing machine implementing the method according to the present invention.

Number 1 in FIG. 1 indicates the input device of a wrapping line 2 of a machine 3 for packing cigarettes 4. More specifically, device 1 comprises a feedbox 5 presenting an upper container 6, and a number of outlets 7 (only one shown), each defined by a number of side by side, substantially vertical channels 8 separated by a number of side by side, substantially vertical partitions 9. Partitions 9 are housed between two outer walls 10 on either side of and substantially parallel to partitions 9, and are limited laterally (FIG. 2) by a transverse front wall 11 and a transverse rear wall 12. Inside each channel 8, cigarettes 4 define a column 13 in which cigarettes 4 are arranged substantially horizontally one on top of the other.

For each outlet 7, device 1 also comprises a transfer device 14 in turn comprising a substantially C-shaped, upwardly-concave box 15 which is movable into a loading position (FIG. 1) beneath respective outlet 7 of feedbox 5, for receiving a respective group 16 of cigarettes 4 from outlet 7 which is defined by the end portions of walls 10, 11 and 12. Groups 16 each comprise at least one layer 17 of cigarettes 4, and are transferred successively from box 15 into respective pockets 18 of a conveyor 19 located in front of wall 11 and by which pockets 18 are advanced continuously in a transverse direction 20 in relation to cigarettes 4 inside feedbox 5.

As shown in FIG. 1, each box 15 comprises two substantially parallel lateral walls 21 alignable with respective walls 10 when box 15 is in the loading position; and a bottom wall 22 perpendicular to walls 21 and fitted with partitions 23 which extend upwards from wall 22 and transversely in relation to direction 20 to define, with one another and with walls 21, a number of channels 24 equal in number to channels 8 and each constituting an extension of a respective channel 8 when box 15 is in the loading position.

Box 15 presents a horizontal, outwardly-extending wing 25 at the top free end of each wall 21, and constitutes a slide movable, vertically in relation to a guide 26, between a raised position wherein box 15 is set to the loading position with its upper inlet 27 contacting the bottom end of feedbox 5 and communicating with outlet 7, and a lowered position wherein inlet 27 of box 15 is separated a given vertical distance from outlet 7.

Like respective box 15, guide 26 is also substantially C-shaped with its concavity facing upwards, and comprises two lateral walls 28 located outwards of walls 21, directly beneath respective wings 25, and connected to each other by a substantially horizontal plate 29 located beneath bottom wall 22 of respective box 15 and which is moved between said raised and lowered positions by four substantially vertical actuators 30 (only two shown) between the top of each wall 28 and respective wing 25.

Device 14 also comprises a comb type push device 31 integral with box 15; and a respective actuator 32 for moving push device 31 back and forth in direction 33 parallel to the axes of cigarettes 4 and perpendicular to direction 20, and so expelling cigarettes 4 in group 16 axially from box 15 towards conveyor 19.

Plate 29 constitutes a slide which is moved in direction 33 and along guides 34 on a plate 35 by actuators 36 (only one shown) interposed between guide 26 and plate 35; and plate 35 defines a slide forming part of device 14 and movable back and forth by an actuator 37 in direction 38 substantially parallel to direction 20 and along a fixed guide 39 extending alongside conveyor 19.

As shown in FIGS. 2a and 2b, device 1 also comprises two stop devices 40 and 41 located on either side of respective outlet 7 and facing each other in direction 33. Devices 40 and 41 are substantially identical, and comprise respective vertical plates 42 and 43 facing the end portions of respective walls 11 and 12 and presenting respective numbers of pins 44 and 45 parallel to one another and to the axes of cigarettes 4. Pins 44 and 45 engage in sliding manner respective seats 46 and 47 formed in respective walls 11 and 12, are at least equal in number to channels 8 of outlet 7, and present an axial length greater than the thickness of respective walls 11 and 12.

By means of respective actuators 48 and 49, plates 42 and 43 are moved back and forth parallel to direction 33, so as to move respective pins 44 and 45 through respective seats 46 and 47 and between a forward stop position (FIG. 2b) wherein the free ends of each pair of opposite pins 44 and 45 project inside the bottom end of a respective channel 8 to arrest, i.e. stop the flow of cigarettes 4 along channel 8, and a withdrawn position (FIG. 2a) wherein each pair of opposite pins 44 and 45 is withdrawn clear of respective channel 8.

In actual use, at the start of each cycle for withdrawing group 16 from outlet 7 of feedbox 5, box 15 is set to the raised loading position beneath outlet 7, to receive cigarettes 4 which drop down out of channels 8 into channels 24 and on to the upper surface of bottom wall 22 of box 15. At the end of the filling cycle, the cigarettes 4 withdrawn from feedbox 5 occupy all the space defined by channels 24, and define inside box 15 a group 16 with an upper layer 17 contacting cigarettes 4a in the bottom layer 50 inside feedbox 5 at outlet 7.

At this point, stop devices 40 and 41 are activated to move respective pins 44 and 45 through respective seats 46 and 47, and insert the free ends of pins 44 and 45 inside channels 8 and beneath cigarettes 4a to arrest layer 50 inside feedbox 5; and actuators 30 are operated to move box 15 from the raised position (FIG. 2a) to the lowered position (FIG. 2b) wherein wall 22 is positioned contacting plate 29 and coplanar with the bottom walls of pockets 18 of conveyor 19.

At this point, actuators 36 and 37 are operated simultaneously, the first of which move box 15 in direction 33 so that the end of box 15 facing pockets 18 contacts the lateral edge of conveyor 19; and the second of which moves plate 35 along guide 39 in direction 38 and in the same direction as direction 20, so that box 15 travels at the same speed as conveyor 10. In other words, the combined action of actuators 36 and 37 provides for moving box 15 along a curved path P tangent to conveyor 19 and substantially transversal in relation to the axis of cigarettes 4a. As it travels along path P, box 15 is caught up with by a pocket 18 which, upon box 15 reaching the same speed as conveyor 19, moves into line with and advances alongside box 15 for as long as it takes to operate actuator 32, feed push device 31 through box 15 and so transfer group 16 into respective pocket 18. Actuators 37, 36, 32 and 30 are then operated in reverse to restore box 15 to its original loading position, ready to receive the next group 16 and repeat the above transfer cycle.

In connection with the above, it should be pointed out that, by arresting, i.e. stopping cigarettes 4a inside feedbox 5 and shifting box 15 vertically so as to detach upper layer 17 of group 16 inside box 15 from cigarettes 4a in layer 50, box 15 may be moved along path P in a substantially transverse direction in relation to cigarettes 4 without this automatically damaging cigarettes 4a or cigarettes 4 in layer 17.

According to a variation not shown, box 15 provides for receiving one layer 17, and groups 16 are formed inside pockets 18 by successively feeding a given number of layers 17 in known manner into each pocket 18. In which case, obviously, each layer 17 is fed into respective pocket 18 in the same way as each group 16 in the example shown.

The variation shown schematically in FIGS. 3a and 3b relates to an input device 51 which, in the example shown, provides for forming groups 16 inside pockets 18 by supplying a succession of layers 17, and the parts of which structurally and/or functionally similar to those of device 1 are indicated using the same numbering system.

Input device 51 differs from device 1 by stop devices 40 and 41 being replaced by a single stop device 52 comprising a movable shift box 53 beneath outlet 7 and over box 15, and a number of fixed pins 54 parallel to the axis of cigarettes 4 and each located between shift box 53 and box 15, at a distance from outlet 7 approximately equal to but no less than the diameter of cigarette 4, and centrally in relation to a respective channel 8.

Shift box 53 comprises a number of partitions 55 made integral with one another by a frame (not shown) comprising two end walls (not shown) perpendicular to partitions 55 which are equal in number to partitions 9, and define a number of passages 56 of the same width as channel 8. Device 52 also comprises a known actuator (not shown) connected to said frame (not shown), for moving shift box 53 back and forth between a loading position (FIG. 3a) and an unloading position (FIG. 3b).

When shift box 53 is in the loading position, each passage 56 is aligned with the outlet of a respective channel 8 to define, with a respective pin 54, a respective compartment 57 for receiving from respective channel 8 a respective cigarette 4 which, together with the other cigarettes 4 in the other compartments 57, defines a layer 17. When shift box 53 is in the unloading position, shifted laterally in relation to the loading position by a distance substantially equal to half the width of channel 8 and directly over box 15, each partition 55 is positioned directly over a respective pin 54, so that the bottom ends of compartments 57 are no longer closed by pins 54, and respective cigarettes 4 drop down into box 15 to form, inside box 15, the layer 17 formerly formed inside shift box 53. At the same time, partitions 55 block the outlets of channels 8 so as to vertically detach layer 17 inside box 15 from bottom layer 50 in feedbox 5.

Operation of device 51 is easily deducible from device 1, the only difference being that box 15 of device 51 requires no vertical shifting away from feedbox 5.

Device 51 may of course be converted into an input device for groups 16 of cigarettes 4, such as device 1, by simply adopting a box 15 for a number of layers 17, and a shift box 53 of the same height as the modified box 15, i.e. with partitions 55 of a height equal to a given multiple of the height of partitions 55 shown.

The variation shown schematically in FIGS. 4a, 4b and 4c relates to a further input device 58, the parts of which structurally and/or functionally similar to those of device 51 are indicated using the same numbering system.

As opposed to a number of pins 54 as in device 51, input device 58 comprises a fixed box container 59 located directly beneath and substantially similar to shift box 53. Box container 59 presents a number of partitions 60 aligned with partitions 9 and defining passages 61 aligned with channels 8; and a stop device 62 closing the bottom of passages 61 to define, with each pair of partitions 60, a compartment 63 for receiving a cigarette 4 which, together with the other cigarettes 4 inside the other compartments 63, defines a layer 17.

According to variations not shown, stop device 62 may be defined by a pair of devices 40 and 41, or by devices similar to 40 and 41, and wherein pins 44 and 45 are replaced by air jets defining an air "wall" supporting columns 13. In the example shown, stop device 62 comprises a pair of plates 64 (only one shown) located on either side of box container 59 and perpendicular to cigarettes 4, and which, by means of respective known actuators (not shown), are moved back and forth, parallel to the axis of cigarettes 4, between a withdrawn position (shown schematically in FIG. 4c) wherein they are clear of cigarettes 4, and a closed position (FIGS. 4b and 4c) wherein they interfere with the ends of cigarettes 4 inside box container 59, so as to close the bottom of compartments 63.

Operation of device 58 is easily deducible from device 51 and therefore requires no further explanation. In this case also, groups 16 as opposed to layers 17 may be formed in one go by simply increasing the height of partitions 55 and 60.

We claim:

1. A method of feeding groups (16) of elongated tobacco articles (4) from a feedbox (5) to a continuous packing machine (3); each said group (16) being defined by at least one layer (17) of articles (4); the feedbox (5) having a bottom open end (7) through which said groups may be extracted in a first direction extending transversely of the articles; and the packing machine (3) including an input conveyor (19) which is a pocket conveyor having pockets (18) advancing, in use, in a continuous manner and with a predetermined speed in a second direction (20) extending transversely of the articles (4) and the first direction; the method comprising:

advancing the articles (4) in said first direction along the feedbox (5) and towards said open bottom end (7) and, for each said group (16), withdrawing the group (16) from said bottom open end (7) in said first direction while stopping, within the feedbox (5), all the remaining articles (4) arranged above said withdrawn group (16);

moving each group (16) when being withdrawn from said bottom open end (7), in said first direction to a position substantially coplanar with said pocket conveyor (19);

accelerating the withdrawn group in said second direction (38 & 20) to the advancement speed of the pocket conveyor to bring and keep said group in registry with a pocket (18) of said conveyor and, while in registry;

feeding the group (16) into the pocket (18) by displacing the group in a third direction (33) parallel to the articles.

2. A method as claimed in claim 1, wherein said first direction is a vertical direction; each said group (16) being moved, when being withdrawn from said bottom open end (7), in said first direction into a box (15) arranged beneath the bottom open end (7).

3. A method as claimed in claim 2, wherein said box (15) is arranged at a level higher than said conveyor (19); each said group being first further moved with the box (15) in said first direction to a position coplanar with said conveyor (19) after stopping said remaining articles (4) inside the feedbox (5), and being then accelerated in said second direction together with the box (15).

4. A method as claimed in claim 1, wherein said first direction is a vertical direction; each said group (16) being moved, when being withdrawn from said bottom open end (7), in said vertical direction into a first box (15), arranged beneath the bottom open end (7), via a second box (53; 59) located beneath said bottom open end (7) and above said first box (15); the second box having a closing bottom, which is opened, after stopping said remaining articles (4) inside the feedbox (5), to allow the articles (4) in said group (16) to fall into the first box (15) which is located a given vertical distance from said bottom open end (7) of the feedbox (5).

5. A method as claimed in claim 4, wherein the second box (53) is a shift box having a number of partitions (55) defining a number of substantially vertical passages (56); the bottom of the second box (53) being opened by moving the second box (53) in said second direction in relation to said articles (4) from a position wherein each said passage (56) interferes with a respective fixed closing element (54) to a position wherein each said partition (55) interferes with the articles (4) at said bottom open end (7) of the feedbox (5).

6. A method as claimed in claim 1, wherein said first direction is a vertical direction; each said group (16) being moved, when being withdrawn from said bottom open end (7), in said vertical direction into a first box (15), arranged beneath the bottom open end (7), via a second box (53) and a third box (59) located in series beneath the outlet (7) of the feedbox (5); the second box (53) being a shift box presenting a number of partitions (55) defining a number of substantially vertical passages (56); and said remaining articles (4) being stopped inside the feedbox (5) by moving the second box (53) transversely from a position wherein each partition (55) is aligned with a corresponding partition (9) inside the feedbox (5), to a position wherein each partition (55) of the second box (53) interferes with the articles (4) at the outlet (7) of the feedbox (5).

7. A method as claimed in claim 6, wherein the third box is provided with closing means (64) which are deactivated when the second box (53) is in said position of interference, to allow the articles (4) in said group (16) to drop down into the first box (15).

* * * * *